A. A. ROSENGREN.
DEVICE FOR THE FEEDING OF BOTTLES OR OTHER VESSELS TO MACHINES INTENDED FOR TREATING THEM.
APPLICATION FILED DEC. 5, 1919.
1,344,653.
Patented June 29, 1920.
4 SHEETS—SHEET 1.
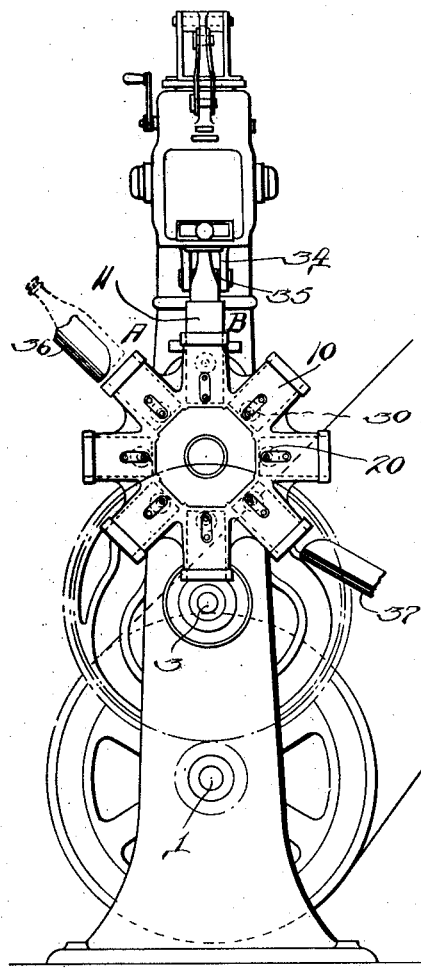
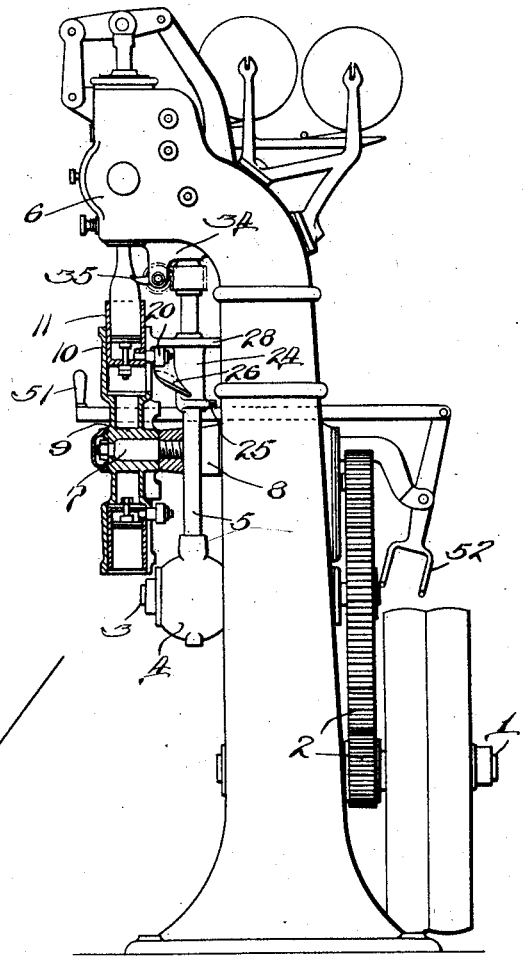
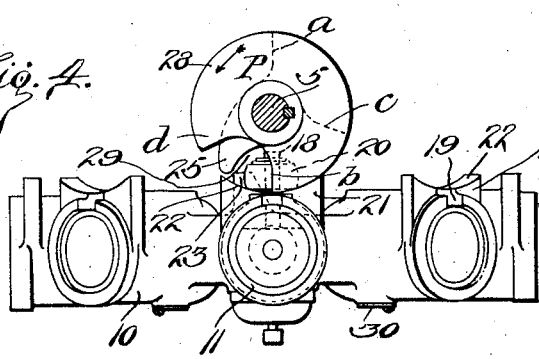

A. A. ROSENGREN.
DEVICE FOR THE FEEDING OF BOTTLES OR OTHER VESSELS TO MACHINES INTENDED FOR TREATING THEM.
APPLICATION FILED DEC. 5, 1919.
1,344,653.  Patented June 29, 1920.
4 SHEETS—SHEET 2.
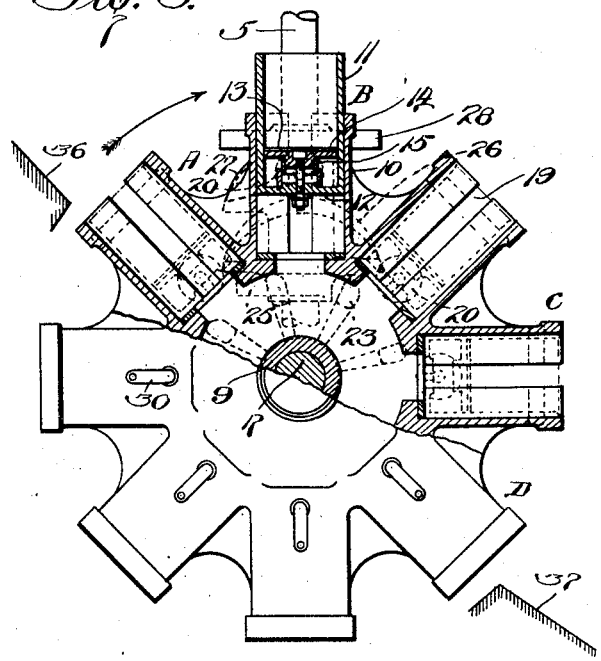
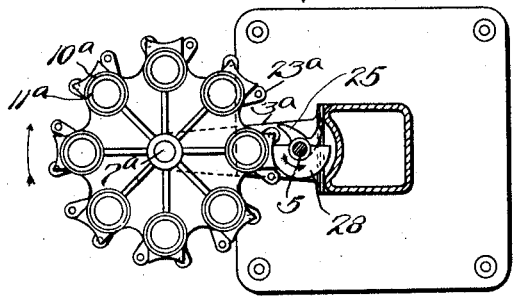
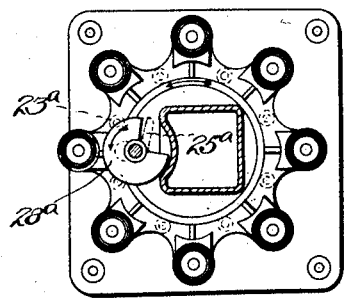
Inventor:
A. A. Rosengren
By H. R. Kerslake.
Atty

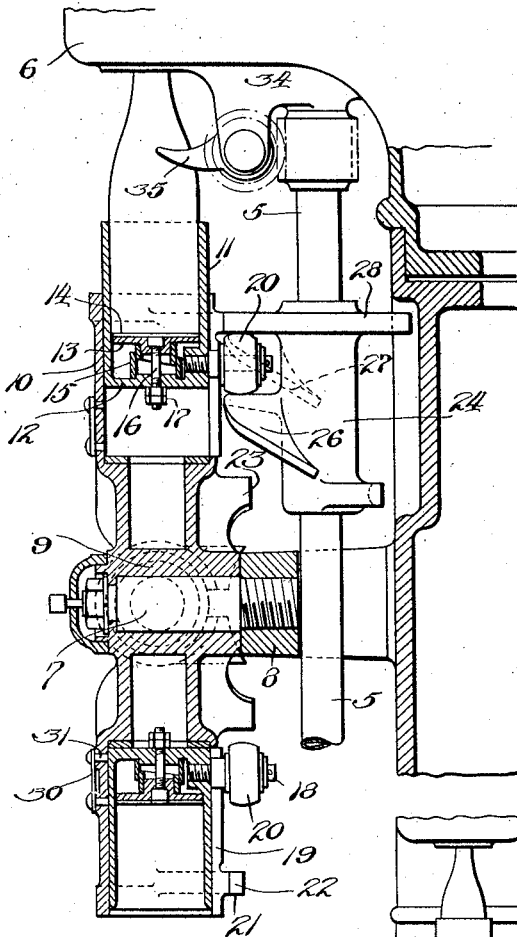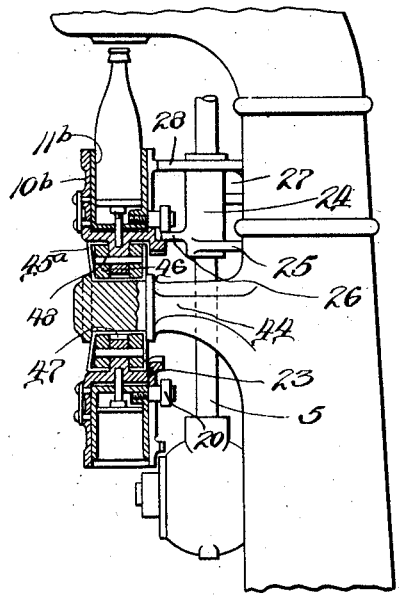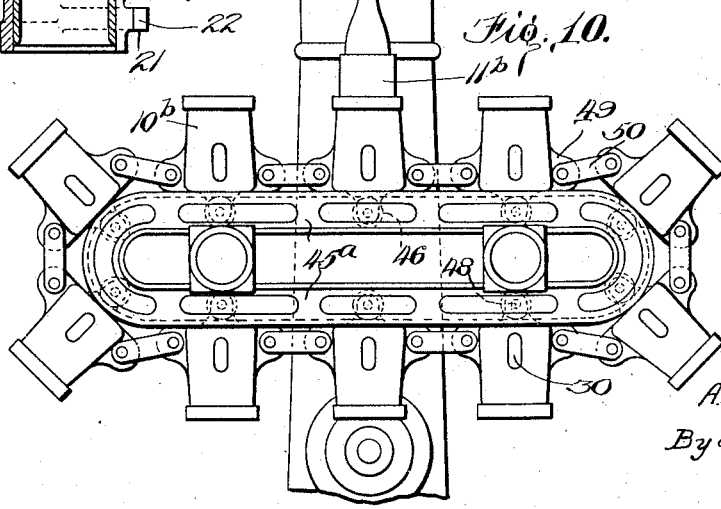

A. A. ROSENGREN.
DEVICE FOR THE FEEDING OF BOTTLES OR OTHER VESSELS TO MACHINES INTENDED FOR TREATING THEM.
APPLICATION FILED DEC. 5, 1919.
1,344,653.  Patented June 29, 1920.
4 SHEETS—SHEET 4.
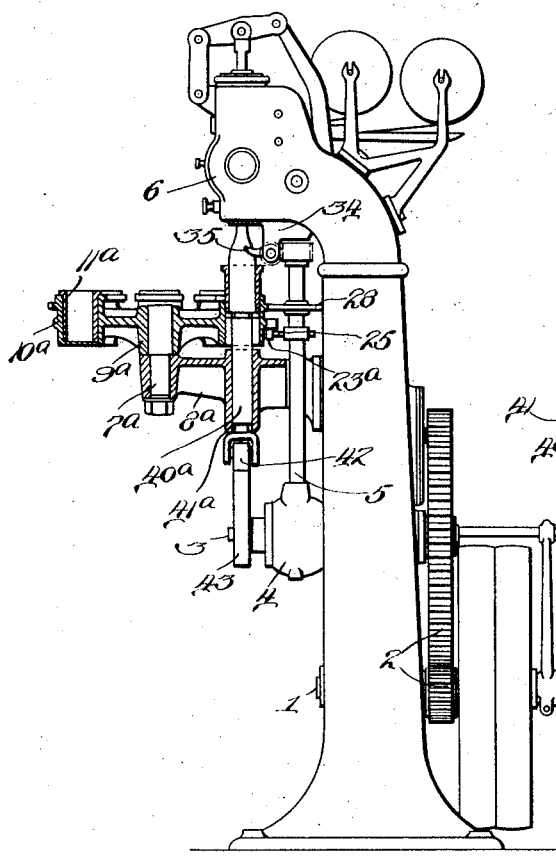
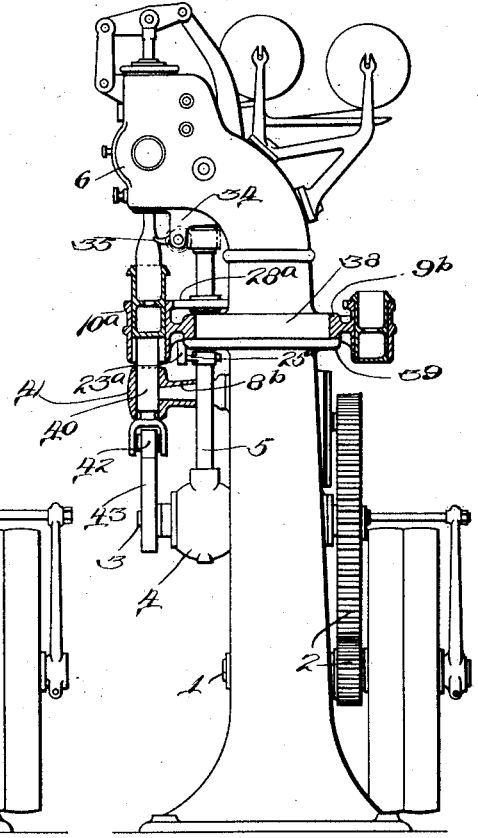
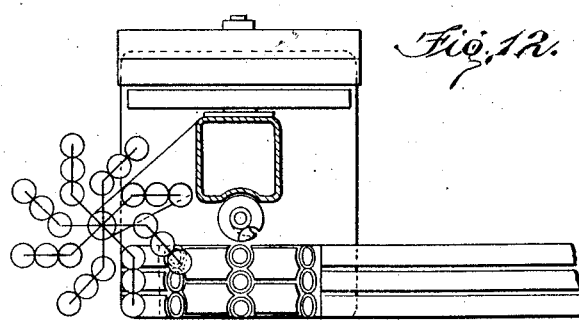
Inventor:
A. A. Rosengren
By H. R. Kerslake
Atty.

UNITED STATES PATENT OFFICE.

ANDERS ANDERSSON ROSENGREN, OF MALMÖ, SWEDEN.

DEVICE FOR THE FEEDING OF BOTTLES OR OTHER VESSELS TO MACHINES INTENDED FOR TREATING THEM.

1,344,653.  Specification of Letters Patent.  Patented June 29, 1920.

Application filed December 5, 1919. Serial No. 342,859.

*To all whom it may concern:*

Be it known that I, ANDERS ANDERSSON ROSENGREN, a subject of the King of Sweden, and resident of 70b Södra Förstadsgatan, Malmö, in the Kingdom of Sweden, have invented certain new and useful Improvements in Devices for the Feeding of Bottles or other Vessels to Machines Intended for Treating Them, of which the following is a specification, reference being made to the accompanying drawings.

The present invention comprises devices for the feeding of bottles or other vessels to machines in which the vessels are to be treated in one way or another, as for example, to be furnished with sealing capsules. A vessel feeding device carried out in accordance with the present invention is characterized primarily by the fact that it is provided with parts or holders serving to receive the vessels, and which holders are placed in intermittently movable guides arranged in succession to one another in an endless row (or in endless rows located side by side), and in which guides the vessel holders are movable from a position, in which they receive the vessels, to a position, in which the vessels are held in a position suitable for the intended operation, and back to the first-mentioned position. After the performance of the operation (*e. g.* the capsuling) the vessel holders deliver the vessels in order thereupon to be supplied with other vessels which are to be subjected to the same operation.

On the accompanying drawings are shown by way of example various forms of the present invention, applied to machines for furnishing bottles with sealing capsules. Figures 1 and 2 show one form of the invention mounted on such a machine; in Fig. 1 the capsuling machine and its feeding device are shown viewed from front, while in Fig. 2 the capsuling machine is shown seen from one side and the feeding device is shown in vertical section. Figs. 3, 4 and 5 show the same feeding device, viewed from in front and partially in section, in plan and in vertical section respectively, the section being taken at right angles to the section shown in Fig. 3. Figs. 6 and 7 show, in vertical section and in plan respectively, a second form of the invention likewise applied to a capsuling (sealing) machine. Figs. 8 and 9 illustrate in the same way a third form which is also applied to a capsuling machine, while Figs. 10 and 11 show, viewed from in front and in vertical section respectively a fourth form. Fig. 12 shows schematically a sealing device which is a manifold of the feeding device shown in Figs. 1 to 5.

The capsuling machine to which this invention is shown applied is performed in accordance with the applicant's Swedish Patent No. 40480, although it may also be of some other construction. From the horizontal main shaft 1 of the capsuling machine another horizontal shaft 3 is driven by means of a cylindrical toothed gearing 2, the shaft 3 in its turn driving, with the aid of a conical toothed gearing placed in a casing 4, a vertical shaft 5, which passes up into the frame head 6 of the capsuling machine for the purpose of driving the matrix cylinder placed therein, by means of which cylinder capsules are formed and are placed on the heads of the bottles, which are to be sealed with the capsules and which are fed to the capsuling machine by the device in question. The shaft 5 carries a device for bringing about an intermittent motion or rotation of that part of the feeding device in which the bottles are situated, a device for raising the bottles into the position in which they are capsuled, and a device for locking that part of the feeding device which supports the bottles, so that the bottle, which is being capsuled, is kept centered in relation to the capsuling device—all as will be further described.

On a pivot 7, fixed on the frame of the capsuling machine by means of a bow 8 (Fig. 5), is rotatably mounted a nave 9, around which are arranged sleeves 10, which are firmly connected with, or integral with the nave and the axes of which coincide with lines extending radially from the center line of the pivot 7. The sleeves 10 form guides for sleeves 11 displaceable in them, these sleeves serving as holders for the bottles in the feeding device. The sleeves or bottle holders 11 are provided both with fixed bottoms 12 (Figs. 3 and 5) and with movable bottoms 13, on the outwardly facing side of which a soft or elastic bed 14 for the bottle in the holder is fixed. Between the firm bottom 12 and the movable bottom 13 of each bottle holder 11 is placed a spiral (buffer) spring 15 (Fig. 5), and in the movable bottom 13 is fixed a screw bolt 16, which passes through the fixed bottom 12 and is at the outer sides of the latter provided with nuts 17, by means of which both the position of the loose bottom in the bottle holder and the tension of the spring 15 can be regulated.

In each bottle holder 11 is screwed a pin 18, which passes out of the sleeve or guide 10 through an elongated opening 19 in the same, and which pin on its part situated at the outer side of the guide carries a roller 20.

Each guide 10 is provided with a projection 21 (divided into two parts by the opening 19 extending to the free edge of the guide) which forms a surface 22, bent along an arc of a circle, the center of which falls into the center line of the shaft 5 when the guide, with the bottle in it, enters into the capsuling position, in which the bottle is to be held centered.

The part rotatable around the pivot 7, and forming the nave 9 and the guides 10 is provided with projections 23, one for each guide.

As mentioned above, the shaft 5 carries a device for bringing about an intermittent motion or rotation of the part of the feeding device containing the bottles, a device for raising the bottles into the position in which they are capsuled, and a device for locking the said part of the feeding device, so that the bottle, which is being capsuled, is held centered relatively to the capsuling device during the capsuling operation. These three devices which for their respective purposes coöperate with devices already referred to, are situated on a sleeve 24, firmly mounted on the shaft 5.

The first-mentioned of these three devices occurring on the sleeve 24 consists of a projection or a driver 25, which once during each revolution of the shaft 5 impinges on one of the projections or impact pieces 23, one after the other, whereby the guides 10 with their bottle holders 11 are caused to rotate intermittently around the pivot 7.

The device for raising the bottles into their capsuling position consists of a wing-shaped cam 26, which obliquely rises and falls in the longitudinal direction of the shaft 5 and the upper side of which forms a track for the rollers 20, which successively move on this track. The cam 26 extends around half the circumference of the sleeve 24; the line $a$ in Fig. 4 indicates the front edge of the same, and thence the cam extends in a direction opposite to that of the arrow $p$, which indicates the direction of rotation of the shaft 5 and thus that of the parts carried thereby, to the line $b$, with which the back edge of the cam coincides. Above the cam 26, at a distance from it corresponding to the diameter of the rollers 20, there is arranged on the sleeve 24 another wing-shaped cam 27 obliquely falling in the longitudinal direction of the shaft 5, this cam extending along about one-fourth of the circumference of the sleeve 24, namely from the line $c$ (Fig. 4) to the line $b$, thus above the back part of the cam 6. The cam 27 acts with its under side on the rollers 20.

That part of the locking and centering device which is situated on the sleeve 24 consists of a circular disk 28, which for the purpose coöperates with the curved lug 21 on the one of the guides 10, the bottle holder 11 of which with a bottle in it is for the time being to be kept centered in relation to the capsuling device. The disk 28 is in level with the said lug, and its radius is equal to the radius along which the surface 22 on the lug 21 is bent.

In the disk 28 is arranged a recess 29, in consequence of which the disk allows the lug 21 to move to and from its position in front of the disk.

In order to retain the bottle holders 11 in their guides 10, so that they shall not, by their own weight, slide outward in the guides when the latter slope downward, the following arrangement has been made. To each guide there is attached one end of a plate spring 30, which at its other end is provided with a pin 31 (Fig. 5), which passes through an aperture in the guide and the conical end of which enters into a correspondingly shaped recess in the bottle holder, when the latter is at its inner end position in the guide, in which position the bottle holder is thus retained until it is driven outward by the cam 26, as will be stated.

Above the sleeve 24 there is mounted on the shaft 5 a wheel 32, which meshes with another wheel 33, which is journaled in a bracket 34 fixed to the frame head 6. On the sides of the wheel 33 there are arms 35 rotating with it, the free ends of said arms, which end may, if desired, be covered with a softer material, acting on a bottle, which has been capsuled, and release it, $i.\ e.$ drive it downward, if it has in any way stuck in the capsuling device.

The feeding device shown in Figs. 1 to 5 receives filled bottles from a chute 36, leading from a filling apparatus (for example, such a filling apparatus as is described in applicant's co-pending application bearing Serial No. 342,860, filed Dec. 5, 1919), while the filled bottles provided with a sealing capsule are delivered up to another chute 37, a conveyer belt, or the like, by which they are carried off.

For the purpose of starting or stopping the sealing machine and thus the feeding device, there is operated a handle 51 (Fig. 2) connected with a belt fork 52, by means of which the driving belt of the machine is moved from the idler on the main shaft 1 to the working pulley on it, or vice versa.

The described device works in the following manner. When a bottle holder 11 with its guide 10 is in the position A (Fig. 3), it receives a filled bottle from the chute 36; it is then at its inner position in the guide, as indicated by the dotted lines in Fig. 3. When the bottle holder has received the bottle, the driver 25 acts on the impact piece 23 situated in its way, in consequence of which the feeding device, i. e. the circular row of guides 10 with their bottle holders 11 is turned one step so that the bottle holder, containing a filled bottle, and its guide will arrive at the position B (Fig. 3). Immediately afterward the circular part of the circumference (at $d$ in Fig. 4) of the disk 28 enters into contact with the circular surface 22 formed by the lug 21, whereby—on the continued rotation of the disk 28—the feeding device will be locked, i. e. prevented from turning around the pivot 7 in either direction. In this way the bottle holder, and the bottle in it, will be kept centered in relation to the capsuling device situated above it. In this position of the bottle the cam 26 enters under the roller 20 of the centered bottle holder, in consequence of which the bottle holder, and thus the bottle in it—at the continued rotation of the cam 26—will be lifted (the locking action of the pin 31 on the bottle holder then becoming annuled), so that the bottle head will enter the capsuling device. When the highest part of the cam 26 has reached the roller 20, the capsuling takes place. Thereupon the roller begins to move on the falling part of the cam 26, the cam 27 then, if the bottle holder does not of its own accord move downward or inward in the guide, acting with its under side on the roller and bringing about such a displacement of the bottle holder. (If the bottle should have stuck in the capsuling device, it is released by the arms 35, as previously mentioned.) While the bottle holder at the position B rises and falls, the bottle holder which is now at the position A, receives another filled bottle. After a bottle has been capsuled and with its holder has returned to the inner end position of the latter, in which the bottle holder is locked by the corresponding pin 31, there takes place in the manner indicated (i. e. by means of the driver 25) a new turning of the feeding device one step, so that the bottle which has just entered the device will arrive at the position B, whereupon the described process is repeated.

When the filled and capsuled bottle moves from the position C (Fig. 3) to the position D, it slides out of its holder and is received by the chute 37, by which it is carried farther.

In the feeding device shown in Figs. 1 to 5 the guides 10 with the bottle holders 11 in them are—as is apparent—arranged radially in relation to the axis of rotation of the device, so that the device has a vertical circular row of guides and bottle holders. In the feeding devices illustrated in Figs. 6 to 9, on the other hand, the guides and the bottle holders are arranged parallel with a vertical axis of rotation. In these cases the guides and the bottle holders form horizontal circular rows.

In the feeding device shown in Figs. 6 and 7, the guides $10^a$ with the bottle holders $11^a$ are rotatable around a vertical pivot $7^a$, carried by an arm $8^a$, which is mounted on the frame of the sealing machine. On the pivot $7^a$ is rotatably arranged a nave $9^a$, which carries the guides $10^a$ for the bottle holders $11^a$.

The step-wise turning of the feeding device as well as the centering of the bottle holders in relation to the feeding device is brought about essentially in the same way as in the first mentioned feeding device (Figs. 1 to 5), i. e. with the aid of drivers or disks, arranged on the shaft 5. The impact pieces against which the drivers 25 act are in these latter cases formed by pins $23^a$ fixed on the feeding device and directed downward. In the feeding device shown in Figs. 6 and 7 the driver 25 is, however, double (as is most clearly shown by Fig. 7), i. e. it is provided with two arms which successively during a revolution act on the impact pieces $23^a$ (the number of which is double of that in the feeding device shown in Figs. 1 to 5 respectively).

The raising of the bottles to the capsuling position does not take place in the same manner as in the form first mentioned (Figs. 1 to 5) but by means of the following device. When a bottle holder $11^a$ is in a position to be raised into the capsuling position, it is just above a piston 40, which is movable in a vertical direction in a guide 41, formed by the arm $8^a$ mounted on the frame of the sealing machine. At its lower end the piston 40 carries a roller 42, which rests against the circumference of an eccentric 43, mounted on the shaft 3, which drives the shaft 5. As will easily be understood, this device, like the cam 26 in the first mentioned form of the invention, causes a raising of the bottles to their capsuling position.

Also in the last-mentioned form of the invention there are arms 35 for the release of the bottles, in case they have stuck in the capsuling device.

In Figs. 8 and 9 there is shown a third modification of the feeding device and this form differs essentially from the previously described forms in that the frame of the sealing machine itself forms the pivot of the feeding device. A ring 9<sup>b</sup> is used to replace the nave 9<sup>a</sup> (Figs. 6 and 7) and this ring has a comparatively large diameter, the inner surface of which rests against the inner circumference of a circular flange 38, while on the circular flange at the lower edge thereof there is provided a shoulder 39 on which rests the ring 9<sup>b</sup> carrying the guides 10<sup>a</sup> with their bottle holders 11<sup>a</sup>. The flange 38 and the shoulder 39 thus form a horizontal slide for that part of the feeding device which contains the bottles. The remaining parts of this form are substantially the same as those disclosed in the other forms and it is believed that a further detailed description thereof is unnecessary.

A fourth form of the present invention is shown in Fig. 10 viewed from in front and in Fig. 11 seen from one side and partly in section. From the frame of the sealing machine extend arms 44, at their free ends carrying a chute which consists of two horizontal, parallel parts 45<sup>a</sup> and two semi-circular parts 45 connecting the ends of the horizontal parts 45<sup>a</sup> of the chute. The parts 45<sup>a</sup> and 45<sup>b</sup> of the chute thus form an endless chute. In the said chute there move the rollers 46, which are rotatably fixed to the guides 10<sup>b</sup>; on each guide bottom there is in fact arranged a lug 47, in which is placed a pivot 48, which on each of its ends projecting beyond the lug carries one of the rollers 46. In the upper one of the horizontal parts 45<sup>a</sup> of the chute the rollers run on the bottom of the chute, whereas the rollers in the lower part of the chute run on the inward bent edges of the chute. Outside the chute the guides are provided with lugs 49, which are connected with each other by means of links 50, so that all the guides together form an endless row, which is movable around the endless chute 45<sup>a</sup>, 45<sup>b</sup>, carrying the endless row of the guides 10<sup>b</sup> with the bottle holders 11<sup>b</sup> in them.

The intermittent movement of the guides 10<sup>b</sup> with their bottle holders 11<sup>b</sup>, the raising of the bottle holders with the filled bottles placed in them into their capsuling position, and the locking of the guides and the bottle holders, so that the bottles are kept centered during the capsuling, take place in the same manner and by means of the same devices as in the feeding device shown in Figs. 1 to 5, whence these devices, which in Figs. 10 and 11 are designated in the same way as in Figs. 1 to 5, and their mode of operation need not be further described here.

In Fig. 12 is shown diagrammatically a feeding device which in essentials is carried out in accordance with Figs. 1 to 5, but the guides of which, with the bottle holders in them, are arranged in three rows situated at the sides of one another. This feeding device is shown combined with a tapping apparatus manifolded in the corresponding manner, and carried out in accordance with applicant's copending application bearing Serial No. 342,860 filed Dec. 5, 1919.

Evidently also the forms of the present invention shown in Figs. 6 and 7, Figs. 8 and 9, or Figs. 10 and 11 respectively, may be manifolded by the arrangement of bottle holder guides situated side by side with one another. Both the single and the manifolded forms may be combined with tapping apparatuses.

The present invention may be carried out in other ways than those mentioned by way of example, while retaining the characteristic features of the invention. Thus, for example, the detail devices for the various purposes may be replaced by other devices which serve the same purposes. The invention may be applied to machines other than capsuling and sealing machines, for instance, to machines for merely capsuling (e. g. for decorative purposes) or sealing (corking) of bottles.

Having now described my invention, what I claim as new and desire to secure by Letters Patent is:

1. A device for feeding bottles or other vessels to capsuling and sealing machines consisting of holders designed to receive the vessels to be filled, an intermittently rotatable support, guides arranged in succession to one another in an endless row and formed radially of the support for receiving the holders, means for effecting an intermittent movement of the support, means for moving the vessels to a position in which the vessels are capsuled and means for locking the guides with the bottle holders therein so that a vessel which is being capsuled is thus held centered in relation to the capsuling device.

2. A feeding device as claimed in claim 1 wherein the means for effecting the intermittent movement of the guides consists of impact pieces on the guides, a rotary shaft, and a driver on the shaft acting successively on the impact pieces.

3. A device for feeding bottles or other vessels to capsuling or sealing machines consisting of holders designed to receive the vessels to be filled, an intermittently rotatable support, guides arranged radially on the support for receiving the holders, means for effecting an intermittent movement of the support, means for moving the vessel holders to a position in which the vessels are capsuled, means for locking the guides and the bottle holders so that the vessel that is being capsuled is held centered in relation to the capsuling device, and means for returning the vessel holders in the event of the return movement failing to take place automatically in consequence of its weight.

4. A feeding device as claimed in claim 1, wherein the means for moving the vessel holders to a capsuling position comprises rollers on the vessel holders a rotatable shaft and a cam mounted on the shaft and forming a track for successively coacting with the rollers for the purpose of moving the vessel holders.

5. A device for feeding bottles or other vessels to capsuling or sealing machines consisting of holders designed to receive the vessels to be filled, an intermittently movable support, guides on the support for receiving the vessel holders, means for effecting an intermittent movement of the support, rollers on the holders, a rotatable cam forming a track for coaction with the rollers for moving the vessel holders to a position in which the vessel is to be capsuled, means for locking the guides and the vessel holders so that the vessel being capsuled is held centered in relation to the capsuling device, and another cam situated above the back part of the first mentioned cam for the purpose of returning the vessel holders in the event the returning movement fails to take place in consequence of their weight.

6. A feeding device as claimed in claim 1 wherein the means for locking and centering the guides consists of lugs provided on the guides, and a rotatable disk the outer edge of which is recessed for successive locking engagement with one of the lugs.

7. A feeding device as claimed in claim 1 wherein the locking and centering means for the guides comprises curved lugs formed on the outer surface of each of the guides and a rotatable disk for successive and locking engagement with the curved lugs and provided with a recess for allowing the lugs to move to and by the disk.

8. A device for feeding bottles or other vessels to capsuling or sealing machines consisting of holders designed to receive the vessels to be filled, an intermittently movable support, guides arranged radially on the support, means for effecting an intermittent movement of the support, impact pieces on the guides, lugs on the guides, rollers on the vessel holders, a driver for coacting with the impact pieces for effecting an intermittent movement of the support, a cam for contacting with the rollers for moving the vessel holders to a position where they may be capsuled, a disk for coaction with the lugs for locking the vessel holders so that they may be held for the intended capsuling operation and common means for operably supporting the driver, cam and disk.

9. A feeding device in accordance with claim 8 wherein a common shaft is employed for rotatably supporting the driver, cam and disk.

10. A feeding device in accordance with claim 8 wherein the common means for operably supporting the driver, cam and disk consists of a rotatable shaft, a sleeve mounted on the shaft with which the driver, cam and disk are integral.

11. A feeding device as claimed in claim 1 wherein the vessel holders are provided with elastic bottoms on which the vessels rest when they are in the vessel holders.

12. A device as claimed in claim 1 wherein means is provided for locking the vessel holders in the guides consisting of springs attached to the guides, and pins on the springs for gripping the vessel holders.

13. A feeding device as claimed in claim 1 wherein movable impact pieces are provided for acting on the vessels for the purpose of releasing them in the event that they become stuck in the capsuling device.

In witness whereof I have hereunto set my hand in presence of two witnesses.

ANDERS ANDERSSON ROSENGREN.

Witnesses:
H. B. OHLSSON,
A. OHLSSON.